(12) United States Patent
Scherrer

(10) Patent No.: US 6,886,713 B1
(45) Date of Patent: May 3, 2005

(54) TOOLBOX WITH DUAL AXIS LID

(76) Inventor: David A. Scherrer, 9743 S. Chanteclair Cir., Highlands Ranch, CO (US) 80126

(*) Notice: Subject to any disclaimer, the term of this patent is extended or adjusted under 35 U.S.C. 154(b) by 304 days.

(21) Appl. No.: 10/198,908

(22) Filed: Jul. 19, 2002

(51) Int. Cl.[7] .............................................. B65D 43/14
(52) U.S. Cl. ...................................... 220/817; 220/818
(58) Field of Search ............................... 220/817, 818, 220/826, 230; 224/404; 296/37.1

(56) References Cited

U.S. PATENT DOCUMENTS

| | | | | |
|---|---|---|---|---|
| 300,441 | A | * 6/1884 | Borst .......................... | 220/520 |
| 3,640,423 | A | * 2/1972 | Parker et al. ................ | 220/324 |
| 4,288,011 | A | * 9/1981 | Grossman .................... | 224/404 |
| 4,488,669 | A | * 12/1984 | Waters ........................ | 224/404 |
| 4,635,992 | A | * 1/1987 | Hamilton et al. .......... | 296/37.6 |
| 5,076,641 | A | * 12/1991 | Lindberg ................ | 297/188.19 |
| 6,170,723 | B1 | * 1/2001 | Howell ........................ | 224/404 |

FOREIGN PATENT DOCUMENTS

JP 07-215133 * 8/1995

OTHER PUBLICATIONS

English Abstract from JPO web site for JP 07–215133, 2 pages.*

English machine transaltion of JP 07–215133 from JPO web site, 4 pages.*

* cited by examiner

Primary Examiner—Joseph C. Merek

(57) ABSTRACT

A truck bed toolbox is provided including a housing having an open top, and a pair of cover assemblies mounted on the housing for covering the open top of the housing. Each cover assembly includes a frame and a cover. The frame is mounted on the housing adjacent to the open top. The frame includes a pair of elongated sides and a pair of elongated ends, with a first one of the sides of the frame being pivotally mounted on the housing. One of the end edges of the cover is pivotally mounted on an inboard one of the ends of one of the frames. The covers of the cover assemblies are each pivotable about a first axis and a second axis, the first axis being oriented substantially perpendicular to the second axis.

16 Claims, 2 Drawing Sheets

TOOLBOX WITH DUAL AXIS LID

BACKGROUND OF THE INVENTION

1. Field of the Invention

The present invention relates to toolboxes and more particularly pertains to a new toolbox with dual axis lid for allowing convenient access to a truck bed mounted toolbox.

2. Description of the Prior Art

The use of toolboxes is known in the prior art. More specifically, toolboxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,998,425; U.S. Pat. No. 4,967,944; U.S. Pat. No. 4,674,665; U.S. Pat. No. Des. 285,673; U.S. Pat. No. Des. 324,197; and U.S. Pat. No. 5,348,383 which are each incorporated herein by reference.

In these respects, the toolbox with dual axis lid according to the present invention substantially departs from the conventional concepts and designs of the prior art, and in so doing provides an apparatus primarily developed for the purpose of allowing convenient access to a truck bed mounted toolbox.

SUMMARY OF THE INVENTION

In view of the foregoing disadvantages inherent in the known types of toolboxes now present in the prior art, the present invention provides a new toolbox with dual axis lid construction wherein the same can be utilized for allowing convenient access to a truck bed mounted toolbox.

The general purpose of the present invention, which will be described subsequently in greater detail, is to provide a new toolbox with dual axis lid apparatus and method which has many of the advantages of the toolboxes mentioned heretofore and many novel features that result in a new toolbox with dual axis lid which is not anticipated, rendered obvious, suggested, or even implied by any of the prior art toolboxes, either alone or in any combination thereof.

To attain this, the present invention generally comprises a housing having an open top surrounded by an upper peripheral edge. The invention further comprises a pair of cover assemblies mounted on the housing for covering the open top of the housing. Each cover assembly includes a frame mounted on the upper peripheral edge of the housing adjacent to the open top. The frame includes a pair of elongated sides and a pair of elongated ends, with a first one of the sides of the frame being pivotally mounted on the housing at the upper peripheral edge adjacent to a rear of the housing. Each of the cover assemblies also includes a cover having a top face and a peripheral lip coupled to a periphery of the top face. The peripheral lip depends downwardly from the periphery of the top face, and comprises a pair of side edges and a pair of end edges. An inboard one of the end edges of the cover is pivotally mounted on an inboard one of the ends of one of the frames. The covers of the cover assemblies are each pivotable about a first axis and a second axis, with the first axis being oriented substantially perpendicular to the second axis.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new toolbox with dual axis lid apparatus and method which has many of the advantages of the toolboxes mentioned heretofore and many novel features that result in a new toolbox with dual axis lid which is not anticipated, rendered obvious, suggested, or even implied by any of the prior art toolboxes, either alone or in any combination thereof.

It is another object of the present invention to provide a new toolbox with dual axis lid which may be easily and efficiently manufactured and marketed.

It is a further object of the present invention to provide a new toolbox with dual axis lid which is of a durable and reliable construction.

An even further object of the present invention is to provide a new toolbox with dual axis lid which is susceptible of a low cost of manufacture with regard to both materials and labor, and which accordingly is then susceptible of low prices of sale to the consuming public, thereby making such toolbox with dual axis lid economically available to the buying public.

Still yet another object of the present invention is to provide a new toolbox with dual axis lid which provides in the apparatuses and methods of the prior art some of the advantages thereof, while simultaneously overcoming some of the disadvantages normally associated therewith.

Still another object of the present invention is to provide a new toolbox with dual axis lid for allowing convenient access to a truck bed mounted toolbox.

Even still another object of the present invention is to provide a new toolbox with dual axis lid that includes a housing having an open top surrounded by an upper peripheral edge. The invention further comprises a pair of cover assemblies mounted on the housing for covering the open top of the housing. Each cover assembly includes a frame mounted on the upper peripheral edge of the housing adjacent to the open top. The frame includes a pair of elongated sides and a pair of elongated ends, with a first one of the sides of the frame being pivotally mounted on the housing at the upper peripheral edge adjacent to a rear of the housing. Each of the cover assemblies also includes a cover having a top face and a peripheral lip coupled to a periphery of the top face. The peripheral lip depends downwardly from the periphery of the top face, and comprises a pair of side edges and a pair of end edges. An inboard one of the end edges of the cover is pivotally mounted on an inboard one of the ends of one of the frames. The covers of the cover assemblies are each pivotable about a first axis and a second axis, with the first axis being oriented substantially perpendicular to the second axis.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
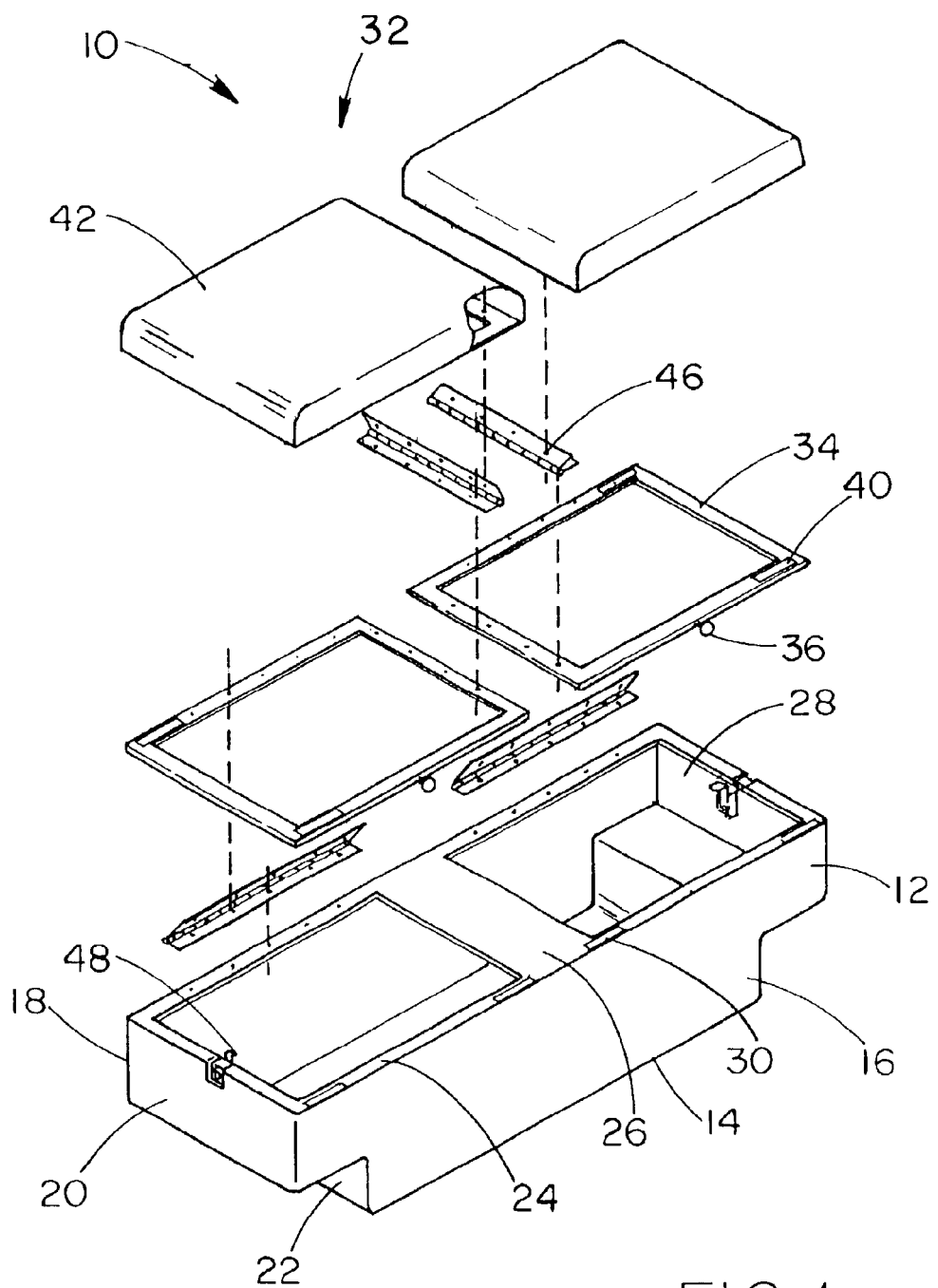
FIG. 1 is an exploded perspective view of a new toolbox with dual axis lid according to the present invention.

With reference now to the drawings, and in particular to FIGS. 1 through 4 thereof, a new toolbox with dual axis lid embodying the principles and concepts of the present invention and generally designated by the reference numeral 10 will be described.

The present invention, designated as numeral 10, includes a housing 12 having a bottom face 14 and a peripheral side wall integrally coupled to a periphery of the bottom face and extending upwardly therefrom. As such, an interior space, an open top and an upper peripheral edge are defined. The periphery is formed of an elongated front face 16, an elongated rear face 18, and a pair of end faces 20. As shown in the Figures, the bottom face has a pair of rectangular recesses 22 formed in ends thereof adjacent to the end faces. A height of the recesses is half that of the housing. As such, the recesses may be supported by a pair of truck bed side walls during use.

The housing further includes an inwardly extending flange 24 integrally coupled to the upper peripheral edge of the housing. Further, a divider 26 is coupled between the front face and the rear face at the upper peripheral edge of the housing. As such, a pair of square openings 28 are defined. For reasons that will soon become apparent, the inwardly extending flange has two pairs of magnet strips 30 inset therein at ends of the square openings along the front face of the housing. Note FIGS. 1 & 3.

Figure 2:
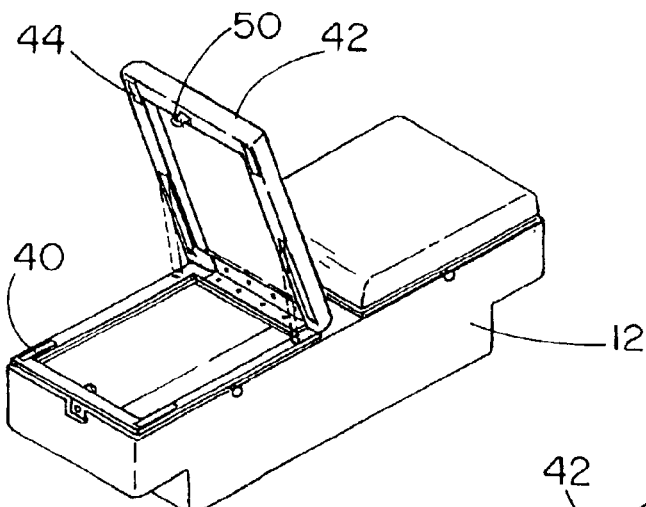
FIG. 2 is a perspective view of the present invention with one of the covers opened in a first orientation.
Figure 3:
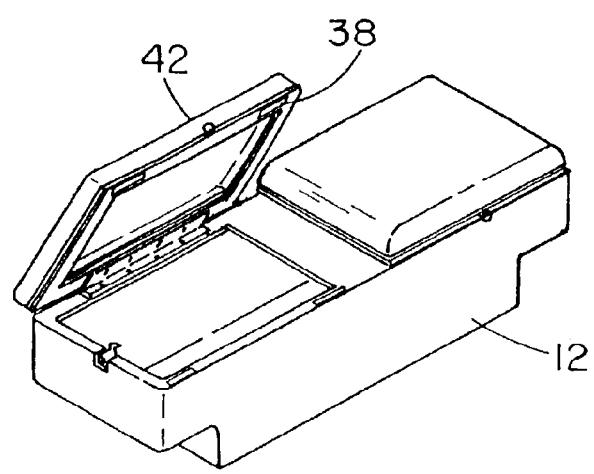
FIG. 3 is a perspective view of the present invention with one of the covers opened in a second orientation.
Figure 4:
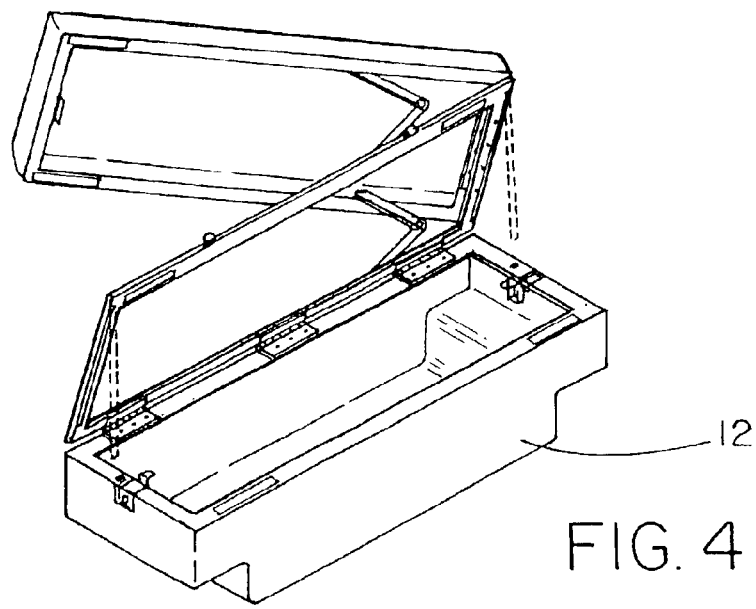
FIG. 4 is a perspective view of another embodiment of the present invention.

Next provided is a pair of cover assemblies 32 each including a rectangular frame 34 with a size and shape similar to that of the inwardly extending flange of the housing surrounding each square opening. Each frame is further defined by a pair of elongated side strips and a pair of end strips. A first one of the side strips of the frame is hingably coupled to the inwardly extending flange along the rear face of the housing. Further, a second one of the side strips of the frame has a gripping knob 36 extending outwardly from a central extent of a periphery of the frame. Ideally, a pair of spaced magnetic strips 38 are mounted in a lower surface of the second side strip of the frame for removably engaging those of the housing. Note FIG. 3. As shown in FIGS. 1 & 2, the side strips of each frame have a magnet strip 40 inset within an upper surface thereof adjacent to an outboard one of the end strips.

The pair of cover assemblies each further include a cover 42 with a top face and a peripheral lip coupled to a periphery of the top face and depending downwardly therefrom. Such peripheral lip of each cover is formed of a pair of elongated side edges and a pair of short end edges. As shown in FIG. 2, an inboard one of the end edges of the cover is hingably coupled to an inboard one of the end strips of one of the frames. The side edges of the cover each have a magnet strip 44 inset within a lower surface thereof adjacent an outboard one of the end edges of the cover. These magnet strips are specifically adapted for removably engaging the magnet strips of the upper surface of one of the frames.

Ideally, each of the hinged couplings is afforded by hinges which each include a pair of elongated planar rectangular members which are pivotally coupled along a side edge thereof. Holes 46 are preferably formed in the members of the hinges to allow coupling along the housing, frame or cover. As an option, a spring biased clip 48 is formed on the upper peripheral edge of the end face of each of the square openings. Such clips extend inward to snappily receive a latch 50 depending from the outboard end edge of one of the covers, thereby securing the cover to the housing with the frame therebetween.

By this structure, the covers each may be pivoted along an axis coincident with the upper peripheral edge of the housing along the rear face thereof. The covers are further adapted to pivot along an axis coincident with an edge of the divider of the housing.

Yet a further option may entail including a pair of rigid linear braces each with a first end pivotally coupled within a recess formed in each frame. Each brace further has a second end removably positioned within a bore or aperture formed in the cover to lock the cover in an open orientation. Note FIG. 2. As an option, the frame may be sized to allow the positioning of a pair of braces between the frame and the housing in a similar manner. In an alternate embodiment, the pair of covers may be excluded in favor of a single cover constructed in accordance with principles of the present invention as set forth hereinabove.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A truck bed toolbox comprising:
   a housing having an open top surrounded by an upper peripheral edge;
   a pair of cover assemblies mounted on the housing for covering the open top of the housing;
   wherein each cover assembly includes:
      a frame mounted on the upper peripheral edge of the housing adjacent to the open top, the frame including a pair of elongated sides and a pair of elongated ends, a first one of the sides of the frame being pivotally mounted on the housing at the upper peripheral edge adjacent to a rear of the housing; and
      a cover having a top face and a peripheral lip coupled to a periphery of the top face, the peripheral lip depending downwardly from the periphery of the top face, the peripheral lip comprising a pair of side edges and a pair of end edges, an inboard one of the end edges of the cover being pivotally mounted on an inboard one of the ends of one of the frames;
   wherein the covers of the cover assemblies are each pivotable about a first axis and a second axis, the first axis being oriented substantially perpendicular to the second axis.

2. The toolbox of claim 1 wherein the housing includes:
   a bottom wall; and
   a peripheral side wall integrally coupled to a periphery of the bottom wall and extending upwardly from the bottom wall to define an interior space, an open top and an upper peripheral edge, the peripheral side wall comprising an elongated front wall, an elongated rear wall, and a pair of end walls.

3. The toolbox of claim 2 wherein the bottom wall has a pair of rectangular recesses formed in ends thereof adjacent to the end walls of the peripheral side wall.

4. The toolbox of claim 3 wherein a height of each of the recesses is approximately one-half of a height of the peripheral side wall between the bottom wall and the open top.

5. The toolbox of claim 1 wherein the housing includes an inwardly extending flange integrally coupled to the upper peripheral edge about the open top.

6. The toolbox of claim 5 wherein the housing includes magnet strips mounted on the inwardly extending flange adjacent to ends of the front wall of the housing.

7. The toolbox of claim 1 wherein the housing includes a divider extending between the front wall and the rear wall at the upper peripheral edge to thereby define a pair of openings in the open top of the housing.

8. The toolbox of claim 1 wherein a second one of the sides of the frame has a gripping knob extending outwardly from a central extent thereof.

9. The toolbox of claim 1 wherein the housing includes at least one magnetic strip being mounted on a lower surface of the second side of the frame for removably engaging the housing at the upper peripheral edge.

10. The toolbox of claim 1 wherein the side edges of the cover each have a magnet strip mounted on a lower surface thereof adjacent to an outboard one of the end edges of the cover for removably engaging the upper surface of one of the frames.

11. The toolbox of claim 1 wherein the first axis is positioned along the upper peripheral edge of the housing adjacent to the rear wall and the second axis is positioned adjacent to an edge of the divider of the housing.

12. A truck bed toolbox comprising:
   a housing including:
      a bottom wall;
      a peripheral side wall integrally coupled to a periphery of the bottom wall and extending upwardly from the bottom wall to define an interior space, an open top and an upper peripheral edge, the peripheral side wall comprising an elongated front wall, an elongated rear wall, and a pair of end walls;
      wherein the bottom wall has a pair of rectangular recesses formed in ends thereof adjacent to the end walls of the peripheral side wall, wherein a height of each of the recesses is approximately one-half of a height of the peripheral side wall between the bottom wall and the open top;
      an inwardly extending flange integrally coupled to the upper peripheral edge about the open top;
      a divider extending between the front wall and the rear wall at the upper peripheral edge to thereby define a pair of square openings is at the open top;
      two pairs of magnet strips mounted on the inwardly extending flange adjacent to ends of the square openings along the front wall of the housing;
   a pair of cover assemblies, each of the cover assemblies including:
      a frame; and
      a cover;
      wherein the frame of the cover assembly is rectangular with a size and shape similar to that of the inwardly extending flange of the housing surrounding each square opening, the frame including:
         a pair of elongated side strips and a pair of end strips, a first one of the side strips of the frame being pivotally mounted on the inwardly extending flange along the rear wall, a second one of the side strips having a gripping knob extending outwardly from a central extent thereof; and
         a pair of spaced magnetic strips mounted on a lower surface of the second side strip for removably engaging the upper peripheral edge of the housing;
      wherein the cover of the cover assembly has a top face and a peripheral lip coupled to a periphery of the top face, the peripheral lip depending downwardly from the periphery of the top face, the peripheral lip comprising a pair of elongated side edges and a pair of short end edges, an inboard one of the end edges of the cover being pivotally coupled to an inboard one of the end strips of one of the frames, the side edges of the cover each having a magnet strip mounted on a lower surface thereof adjacent to an outboard one of the end edges of the cover for removably engaging the upper surface of one of the frames;
      wherein the cover of the cover assembly is pivotable about a first axis and a second axis, the first axis being oriented substantially perpendicular to the second axis; and wherein the first axis is positioned along the upper peripheral edge of the housing adjacent to the rear wall and the second axis is positioned adjacent to an edge of the divider of the housing.

13. The truck bed toolbox of claim 1 wherein the housing is elongated and has opposite ends for positioning adjacent to sides of a cargo bed of a vehicle, the housing including:
 a bottom wall extending continuously between the ends of the housing; and
 a peripheral side wall integrally coupled to a periphery of the bottom wall and extending upwardly from the bottom wall to define an interior space, an open top and an upper peripheral edge, the peripheral side wall comprising an elongated front wall extending continuously between the opposite ends of the housing, an elongated rear wall extending continuously between the opposite ends of the housing, and a pair of end walls each located at the opposite ends of the housing.

14. The truck bed toolbox of claim 1 wherein a distance between a first one of the cover assemblies and a second one of the cober assemblies is fixed.

15. The truck bed toolbox of claim 1 wherein the housing includes a bottom wall and a peripheral side wall integrally coupled to a periphery of the bottom wall and extending upwardly from the bottom wall to define an interior space, the peripheral side wall comprising an elongated front wall, an elongated rear wall, and a pair of end walls, the front wall, rear wall, and end walls all being integrally formed together.

16. The truck bed toolbox of claim 1 wherein the housing is elongated and has opposite ends for positioning adjacent to sides of a cargo bed of a vehicle, the housing including:
 a bottom wall extending without breaks between the ends of the housing; and
 a peripheral side wall integrally coupled to a periphery of the bottom wall and extending upwardly from the bottom wall to define an interior space, an open top and an upper peripheral edge, the peripheral side wall comprising an elongated front wall extending without breaks between the opposite ends of the housing, an elongated rear wall extending without breaks between the opposite ends of the housing, and a pair of end walls each located at the opposite ends of the housing.

* * * * *